Dec. 7, 1937.     J. M. CHRISTMAN     2,101,130
MOTOR VEHICLE
Filed June 29, 1935
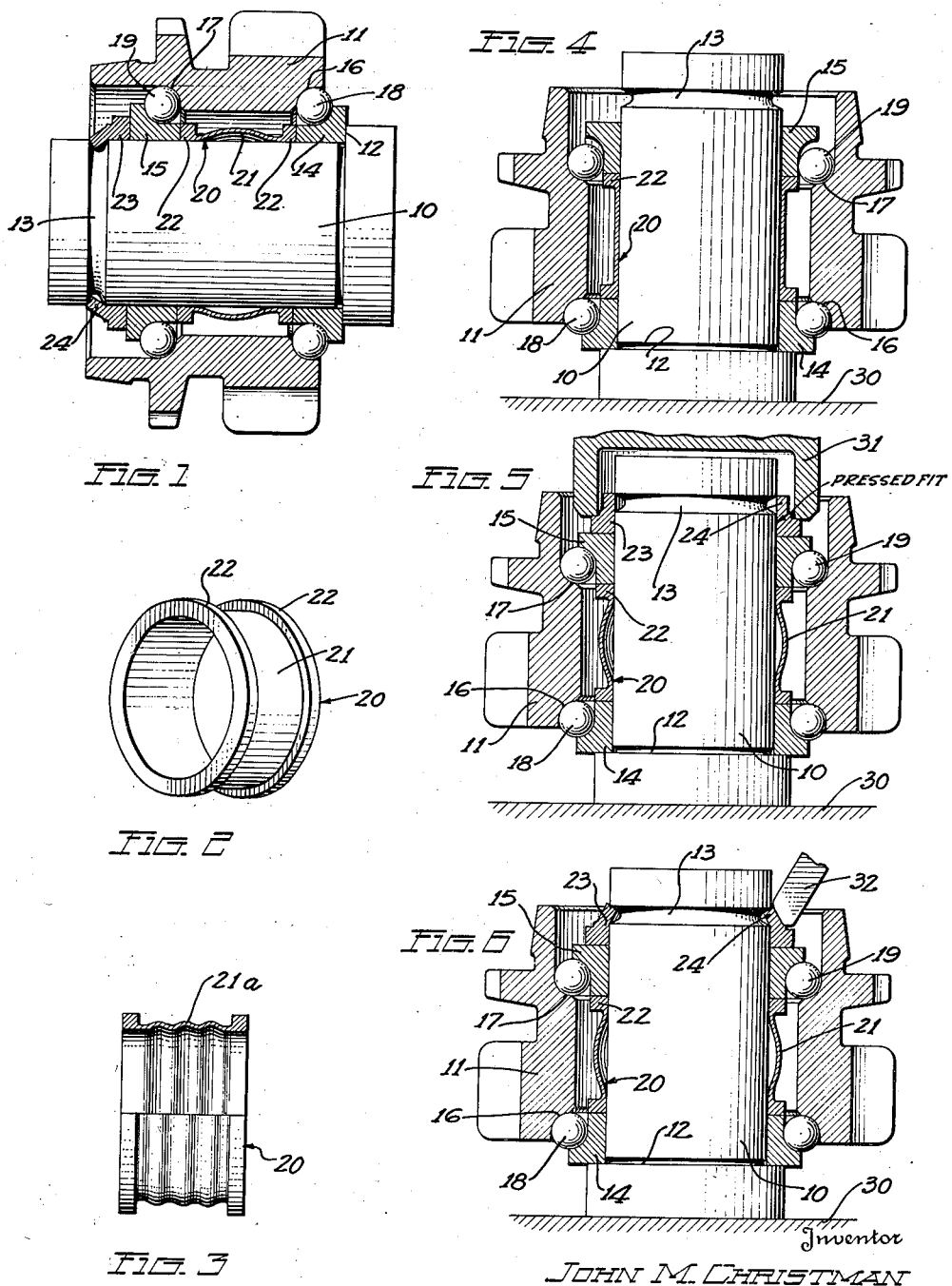
John M. Christman Patented Dec. 7, 1937

2,101,130

UNITED STATES PATENT OFFICE 2,101,130

MOTOR VEHICLE

John M. Christman, Detroit, Mich., assignor to Packard Motor Car Company, Detroit, Mich., a corporation of Michigan Application June 29, 1935, Serial No. 29,167

16 Claims. (Cl. 29—84)

This invention relates to motor vehicles and particularly to the mounting of a rotating element such as a gear.

The invention is more especially concerned with the mounting of a gear element such as the mounting disclosed in the patent application of Walter R. Griswold, Serial No. 11,932, filed March 20, 1935.

The invention is particularly adapted to the mounting of gears in transmission units for motor vehicles where there is necessity for holding the gears closely to center and retaining them accurately against end thrust. It is particularly desirable that the bearings should take as little room between the gear and its supporting shaft as possible in order to keep the size of the gears down. Hence if ball bearings are used, small balls are more desirable and this indicates that full rows of balls should be used.

Because of the cramped space in transmissions of the type described, it is desirable also that unnecessary sleeves on the shaft should be avoided and hence in the present invention the bearings are retained in position by peening the end of a securing ring into a groove in the shaft. This peening operation puts considerable end thrust on the bearing assembly and hence it is desirable to use a spacer between the bearing races on the shaft in order that some of this end thrust may be transferred from one of such races to the other without passing through the balls and gear.

Where spacers of the type described in said patent application, Serial No. 11,932, have been used, it is necessary to carefully select ball races, spacer, and clamping ring of sizes that will produce just the right clearance so that when pressure is applied to the ring in assembling the mounting the desired preloading of the bearings will have been accomplished. This means that these parts must be machined or ground to close limits and that unusual skill and considerable time are required to assemble the mounting if just the right amount of preload is to be obtained.

It is one of the objects of the present invention to provide a bearing construction that will simplify the machining operations of the parts and that will be easier and quicker to assemble than constructions of the prior art.

Another object of the invention is to provide a method of assembling a bearing mounting which will greatly simplify the operation and insure uniformity in the production of mountings in quantities.

Another object of the invention is to provide a spacer for separated bearings such that the spacer may be deformed in the assembly of the bearings to facilitate definite preloading thereof in assembling.

Another object of the invention is to provide a gear mounting with a deformable or crushable separator between ball races so that, in the assembly of the parts, the deformable separator may compensate for inaccuracies of machined parts.

Another object of the invention is to provide a double ball bearing assembly with a deformable spacer between them which will provide a resistance to the end thrust of the retaining ring as it is clamped in position.

Other objects of the invention will appear from the following description taken in connection with the drawing which forms a part of this specification, and in which:

Fig. 1 is a sectional view showing a bearing mounting embodying the invention;

Fig. 2 is a perspective view of a spacer such as was used to form the assembly of the construction of Fig. 1;

Fig. 3 is a part sectional and part elevational view of another form of spacer;

Fig. 4 is a sectional view of all of the parts of a gear mounting except the clamping ring, showing the parts in position for receiving the pressure necessary for assembling;

Fig. 5 is a view similar to Fig. 4, showing the parts pressed into assembled position just prior to peening the clamping ring; and Fig. 6 is a view similar to Fig. 5 with the press removed and the peening tool finishing the operation on the clamping ring.

Referring to the drawing, 10 is a support or shaft and 11 is the rotatable element to be mounted thereon, that shown being a gear for motor vehicle transmission. The shaft 10 is formed with a shoulder 12 and an annular groove 13 spaced therefrom, the portion between the shoulder and the groove being shown as the same cylindrical diameter substantially throughout its length.

There are two ball races on the shaft, the first ball race 14 resting against the shoulder 12 and the second ball race 15 being spaced therefrom and arranged adjacent the groove 13. There are opposed ball races 16 and 17 formed in the gear 11 and there are two rows of balls 18 and 19 in these respective pairs of ball races. Thus the smallest possible ball size can be used for the load required.

The races of the ball bearings are arranged at opposite angles so that end thrust on the gear is taken in one direction by one row of balls and in the other direction by the other row of balls, and it is only necessary to secure the second race 15 against endwise movement in order to retain the gear against endwise movement in both directions.

Between the races 14 and 15 is a spacer or spacing ring 20, which ring is shown as having an intermediate thin wall 21 and thickened or heavy ends 22, and in Fig. 1 the portion 21 of the spacer is shown as bulged outwardly from the shaft which it surrounds. This is because the spacer has been deformed or crushed or distorted in the assembly of the mounting and, in doing so, it compensated for inaccuracies in manufacture of the various parts and it provided just the right amount of resistance to a pressing operation to obtain the desired preload on the ball bearings. But even in its deformed state, the spacer 20 still retains sufficient resisting qualities to maintain constant clamping action between the races 15 and 14 and against the shoulder 12.

At the left end of the mounting and arranged next to the ball race 15 is a clamping ring 23, which ring has a part 24 that has been peened over into the groove 13, thus retaining the parts of the mounting in position.

The spacer or spacing ring 20, before its deformation, was as shown in Fig. 2, in which its intermediate portion 21 is shown as of cylindrical shape. The deformation to the shape shown in Fig. 1 was brought about by the assembly operation, which will be hereinafter described.

Fig. 3 shows another form of spacing ring in which the intermediate portion 21a is crimped or corrugated in cross section. Other forms of spacers may be used, which will permit deformation of the intermediate portion upon pressure being applied at the ends.

In Figs. 4, 5, and 6, the method of assembling the bearing is illustrated. The shaft 10 is shown as placed on end on the supporting part 30 of a suitable press and the parts of the mounting are assembled on the shaft. The ball race 14 is placed against the shoulder 12, the spacer 20 in its non-deformed state is placed next to the race 14, the row of balls 18 is placed in the race 14 and held therein while the gear 11 is placed around them. Then the second row of balls 19 is placed in position and the race 15 is placed inside of them and against the outer end of the spacer 20. The parts are now ready to be pressed into assembled position and it will be seen that the spacer 20 is longer than required to properly space the races 14 and 15 and that the race 15 must be moved endwise of the shaft in order to take up the clearance between this race and the row of balls 19. This space is exaggerated somewhat for purposes of illustration.

Referring to Fig. 5, it will be seen that the ring 23 has been placed on the shaft against the race 15 and the plunger 31 of the press has been brought down against the ring. This ring 23 is preferably a pressed fit on the shaft so that when the parts have been pressed into the position shown in Fig. 5 this pressed fit of the ring on the shaft will cause the parts to be retained temporarily and until the next operation. During the pressing operation referred to the ring 20 will have been crushed endwise so that it is deformed or distorted, all of which deformation takes place in the intermediate portion 21 of the spacing ring. The ends of the ring remain parallel to each other and, consequently, continue to exert an even pressure on the ball races with which they are in contact. The ring is preferably made of cold rolled steel so that it can be deformed as shown.

In Fig. 6 the press plunger 31 has been withdrawn and a peening tool 32 is shown as operating on the flanged part 24 of the clamp ring 23 and it has peened the part 24 into the groove 13 of the shaft 10 and against the outer shoulder of the groove, so that the ring is retained against endwise movement on the shaft and, of course, this retains the two ball races and the spacer on the shaft with the ball race 14 against the shoulder 12.

This peening operation exerts considerable end thrust on the ring 23, and this thrust would be exerted through the bearings of the gear and against the shoulder 12 were it not for the spacer 20 between the races 14 and 15. This spacer in its deformed state is still offering resistance to the movement of the race 15 on the shaft and, therefore, takes considerable of this end thrust, so that the greater part thereof does not pass through the bearings.

The ring 20 is so proportioned as to thickness and material that just the desired preload of the bearings will be obtained when a certain pressure is applied to the ring 23 by the pressing operation and this exact preload is retained when the clamping ring 23 secures the parts in the position to which they are moved by the pressing operation.

The exact amount of deformation of the ring is immaterial to its functioning and, for this reason, the dimensions of the parts, such as the ball races, the ring 23, the spacer 23 itself, and the distance of the groove 13 from the shoulder 12, as well as the distance between the races 16 and 17, need not be as accurate as is required where a non-deformable spacer is used. In fact, grinding of some of these parts may be entirely eliminated, thus making an additional saving.

To recapitulate, all of the parts are assembled on the shaft 10 and the plunger of the press is brought down against the clamping ring with the pressure necessary to press the ring 23 on the shaft and to deform the spacer until the clearance is taken up between the balls and races. Then the pressing operation is continued until a certain load is placed on the balls. In the form in which this invention has already been used in practice the pressure employed is several thousand pounds. Thereafter the peening operation takes place and the bearing assembly is retained in this preloaded condition.

It will be understood that various forms of the invention other than those described above may be used without departing from the spirit or scope of the invention, and while balls and ball races are shown and described, these terms are intended to and do include other types of rolling elements such as cylindrical or conical rollers and correspondingly shaped races.

What is claimed is:

1. The method of assembling a pair of ball bearings in connection with a support in which the bearings are separated by a deformable separator comprising pressing one bearing towards the other to a degree causing deformation of the spacing means beyond its elastic limit and continuing the pressure until the balls of the bearings are under appreciable load, and then securing the bearings to the support with the balls thereof preloaded and with the spacer in its deformed condition.

2. The method of assembling a pair of spaced ball bearings on a shaft comprising pressing one ball bearing towards the other with the spacing means between them, the pressure being continued until the balls of the bearings are under pressure and the spacing means has been partly deformed so that if released it would take a permanent set, then continuing the pressure to the point that an appreciable load is placed on the balls, and then securing the bearings on the shaft with the balls in preloaded condition.

3. A mounting for a rotating element comprising, a shaft having a shoulder and having an annular groove spaced from the shoulder, a rotating element, a pair of ball bearings between the shaft and the element, said bearings being mounted on the shaft between the shoulder and the groove, a metal spacer that has been deformed beyond its elastic limit between the bearings in the assembly thereof, said spacer defining the separation of said bearings, and a ring on said shaft for retaining the bearings thereon and having a portion extending into said groove.

4. A mounting for a rotating element comprising a shaft having a shoulder, a rotating element, a pair of ball bearings between the shaft and the element, one of said bearings being mounted on the shaft against said shoulder, a permanently set deformed metal spacer between the bearings holding the bearings in separated position, and a ring on said shaft connected to the shaft for retaining the bearings thereon.

5. A bearing comprising two inner races and two opposed outer races, balls between the races of each pair, a partly crushed permanently set spacer between and separating the pairs of races, and means clamping the races in position with the spacer partly crushed between them.

6. A bearing comprising two inner races and two opposed outer races, the pairs of races arranged parallel to each other, a full row of balls between the races of each pair, a permanently set deformed spacer between and separating the pairs of races, and means for clamping the races in position with the deformed spacer between them and the balls of the bearings preloaded.

7. A gear mounting comprising a shaft having a shoulder, a ball bearing race against the shoulder, a permanently set deformed spacing ring next to the race, a second ball bearing race next to and separated by the spacing ring, balls resting in said races, a gear having opposed races for said balls, and securing means on the shaft in contact with the said second ball bearing race retaining the parts in position on the shaft with the deformed spacing ring between the first and second ball races.

8. A mounting for a rotating element comprising, a shaft having a shoulder and having an annular groove spaced from the shoulder, a rotating element, a pair of ball bearings between the shaft and the element, said bearings being mounted on the shaft between the shoulder and the groove, a metal spacer that has been deformed beyond its elastic limit between the bearings in the assembly thereof, said spacer defining the separation of said bearings, and a ring on said shaft for retaining the bearings thereon having a portion extending into said groove.

9. The method of assembling a pair of ball bearings in connection with a support in which the bearings are separated by a deformable separator and are held by a clamping ring, comprising pressing one bearing and the ring towards the other bearing to a degree causing deformation of the spacing means beyond its elastic limit and continuing the pressure until the balls of the bearings are under appreciable load, temporarily retaining the bearings in this preloaded condition by the close fit of the ring on the support, and then securing the bearings to the support with the balls thereof preloaded and with the spacer in its deformed condition, by pressing a portion of the ring into the support.

10. The method of assembling a pair of spaced bearings on a shaft comprising pressing one of the bearings towards the other with the spacing means between them, continuing the pressure until the rolling elements of the bearings are under appreciable load and the spacing means has been deformed so that if released it would take a permanent set, and holding the bearings in such preloaded condition and the spacer in such deformed condition.

11. A gear mounting comprising a shaft having a shoulder, a bearing race against the shoulder, a permanently set deformed spacing ring next to the race, a second bearing race next to and separated by the spacing ring, rolling elements resting in said bearing races, means surrounding said shaft and having opposed bearing races for said rolling elements, and securing means on the shaft bearing against said second bearing race retaining the parts in position on the shaft with the deformed spacing ring between the first and second bearing races.

12. A bearing comprising a pair of inner races and a pair of outer races, rolling elements between opposed races, and a spacing element between the races of one of said pairs, said spacing element comprising a ring having an intermediate portion so formed that it will be distorted and take a permanent set as the races between which it is arranged are pressed toward each other.

13. A bearing comprising a pair of inner races and a pair of outer races, rolling elements between opposed races, and a spacing element between the races of one of said pairs, said spacing element comprising a thin body portion and flanged ends unsupported except as they rest against the spaced races.

14. A bearing comprising a pair of inner races and a pair of outer races, rolling elements between opposed races, and a spacing element between the races of one of said pairs, said spacing element comprising a ring having flanged ends unsupported except as they rest against the spaced races and having a thinner intermediate portion.

15. A bearing comprising a pair of inner races and a pair of outer races, rolling elements between opposed races, and a spacing element between the races of one of said pairs, said spacing element comprising a ring having thickened flanged ends unsupported except as they rest against the spaced races.

16. A bearing comprising a pair of inner races and a pair of outer races, rolling elements between opposed races, and a spacing element between the races of one of said pairs, said spacing element comprising a cold-rolled steel ring unsupported except in its contact at its ends against said races, whereby said ring is deformable intermediate its ends.

JOHN M. CHRISTMAN.